(12) United States Patent
Kumar et al.

(10) Patent No.: US 11,376,951 B2
(45) Date of Patent: *Jul. 5, 2022

(54) CONTINUOUSLY VARIABLE ELECTRIC AXLES WITH ON-DEMAND ENERGY HARVESTING CAPABILITIES FOR SECONDARY OR TAG E-AXLES

(71) Applicant: Dana Heavy Vehicle Systems Group, LLC, Maumee, OH (US)

(72) Inventors: Krishna Kumar, Holland, OH (US); William F. Waltz, Toledo, OH (US)

(73) Assignee: Dana Heavy Vehicle Systems Group, LLC, Maumee, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/145,153

(22) Filed: Jan. 8, 2021

(65) Prior Publication Data

US 2021/0129665 A1    May 6, 2021

Related U.S. Application Data

(63) Continuation of application No. 16/487,156, filed as application No. PCT/US2018/019089 on Feb. 22, 2018, now Pat. No. 10,919,385.

(Continued)

(51) Int. Cl.
*B60K 17/04* (2006.01)
*B60K 1/02* (2006.01)
(Continued)

(52) U.S. Cl.
CPC .............. *B60K 17/046* (2013.01); *B60K 1/02* (2013.01); *B60K 17/02* (2013.01); *B60K 17/165* (2013.01);
(Continued)

(58) Field of Classification Search
CPC ........ B60K 17/046; B60K 1/02; B60K 17/02; B60K 17/165; B60K 17/26; B60K 17/28;
(Continued)

(56) References Cited

U.S. PATENT DOCUMENTS 5,558,589 A     9/1996  Schmidt
6,793,600 B2 *  9/2004  Hiraiwa ................ F16H 3/728
                                            475/5

(Continued)

FOREIGN PATENT DOCUMENTS

DE   102010010438 A1   9/2011
DE   102012204717 A1   9/2013
DE   102015106503 A1   11/2015

OTHER PUBLICATIONS

ISA European Patent Office, International Search Report Issued in Application No. PCT/US/2018/019089, dated Nov. 6, 2018, WIPO, 3 pages.

*Primary Examiner* — Dirk Wright
(74) *Attorney, Agent, or Firm* — McCoy Russell LLP

(57) ABSTRACT

Provided herein is an electric powertrain including a differential assembly operably coupled to a drive axle having a set of wheel coupled to the ends thereof; a planetary gear set connected to the differential, the planetary gear set having a sun gear, a planet carrier supporting a plurality of planet gears, and a ring gear, wherein the planet carrier is drivingly engaged with the differential assembly; a first electric motor/generator; a second electric motor/generator; a first gear pass drivingly connected the first electric motor/generator and the ring gear; and a second gear pass drivingly connected the first electric motor/generator and the sun gear.

20 Claims, 4 Drawing Sheets

Related U.S. Application Data

(60) Provisional application No. 62/462,117, filed on Feb. 22, 2017.

(51) Int. Cl.
*B60K 17/02* (2006.01)
*B60K 17/16* (2006.01)
*B60K 17/26* (2006.01)
*F16H 37/04* (2006.01)
*F16H 37/08* (2006.01)
*B60K 17/28* (2006.01)

(52) U.S. Cl.
CPC .......... *B60K 17/26* (2013.01); *F16H 37/041* (2013.01); *F16H 37/0806* (2013.01); *B60K 17/28* (2013.01); *F16H 2702/02* (2013.01)

(58) Field of Classification Search
CPC ..... B60K 17/08; B60K 7/0007; F16H 37/041; F16H 37/0806; F16H 2702/02; B60Y 2200/14; B60Y 2400/73; B60Y 2200/147; B60Y 2200/92
See application file for complete search history.

(56) References Cited

U.S. PATENT DOCUMENTS

| | | | |
|---|---|---|---|
| 6,886,647 | B1 | 5/2005 | Gotta |
| 7,000,717 | B2 | 2/2006 | Ai et al. |
| 7,219,756 | B2 | 5/2007 | Bischoff |
| 9,428,042 | B2 | 8/2016 | Morrow et al. |
| 9,656,659 | B2 | 5/2017 | Shukla et al. |
| 10,315,643 | B2 | 6/2019 | Shukla et al. |
| 10,738,859 | B2 | 8/2020 | Nilsson et al. |
| 10,919,385 | B2 * | 2/2021 | Kumar .................. B60K 17/26 |
| 2009/0111641 | A1 | 4/2009 | Kim et al. |
| 2011/0094807 | A1 | 4/2011 | Pruitt et al. |
| 2012/0165147 | A1 | 6/2012 | Radermacher et al. |
| 2015/0021109 | A1 | 6/2015 | Knoblauch et al. |
| 2015/0210151 | A1 | 7/2015 | Husson et al. |
| 2017/0120739 | A1 | 5/2017 | Wagner et al. |
| 2020/0122572 | A1 | 4/2020 | Kumar et al. |

* cited by examiner

CONTINUOUSLY VARIABLE ELECTRIC AXLES WITH ON-DEMAND ENERGY HARVESTING CAPABILITIES FOR SECONDARY OR TAG E-AXLES

CROSS-REFERENCE TO RELATED APPLICATIONS

This application is a continuation of U.S. patent application Ser. No. 16/487,156, entitled "CONTINUOUSLY VARIABLE ELECTRIC AXLES WITH ON-DEMAND ENERGY HARVESTING CAPABILITIES FOR SECONDARY OR TAG E-AXLES", and filed on Aug. 20, 2019. U.S. patent application Ser. No. 16/487,156 is a U.S. National Phase of International Application No. PCT/US2018/019089, entitled "CONTINUOUSLY VARIABLE ELECTRIC AXLES WITH ON-DEMAND ENERGY HARVESTING CAPABILITIES FOR SECONDARY OR TAG E-AXLES", and filed on Feb. 22, 2018. International Application No. PCT/US2018/019089 claims priority to U.S. Provisional Application No. 62/462,117, entitled "CONTINUOUSLY VARIABLE ELECTRIC AXLES WITH ON-DEMAND ENERGY HARVESTING CAPABILITIES FOR SECONDARY OR TAG E-AXLES", and filed on Feb. 22, 2017. The entire contents of each of the above-listed applications are hereby incorporated by reference for all purposes.

BACKGROUND

Hybrid vehicles are enjoying increased popularity and acceptance due in large part to the cost of fuel and greenhouse carbon emission government regulations for internal combustion engine vehicles. Such hybrid vehicles include both an internal combustion engine a~ well as an electric motor to propel the vehicle.

Commercial vehicles or trailers having two or more rear axles allow such vehicles to carry greater loads when compared to vehicles and trailers having a single axle. A typical six-wheel drive arrangement for a motor vehicle includes an axle having steerable wheels at the front end of the vehicle and tandem axles at the rear of the vehicle.

Traditional tandem axle drivelines include 6×4 drivelines (i.e., 2 wheels on the steer axle and 4 driving wheels on tandem axles behind the steer axle) or 6×2 drivelines (i.e., 2 wheels on the steer axle and 4 wheels on the tandem axles behind the steer axle where only two wheels are on a drive axle). Any axle in the tandem axles may be a drive axle or a dead axle. When an additional axle (secondary axle) is a dead axle, it may be positioned before (a pusher axle) or after (a tag axle) a drive axle.

It may be useful and advantageous to have an electric tag axle with high reduction capabilities using an existing electric motor that is efficient and compact.

Additionally, it may be beneficial to have an electric driven axle that can provide high torque ratios and energy harvesting/energy recuperation abilities.

SUMMARY

Provided herein is an electric powertrain including a differential assembly operably coupled to a drive axle having a set of wheel coupled to the ends thereof; a planetary gear set connected to the differential assembly, the planetary gear set having a sun gear, a planet carrier supporting a plurality of planet gears, and a ring gear, wherein the planet carrier is drivingly engaged with the differential assembly; a first electric motor/generator; a second electric motor/generator; a first gear pass drivingly connected the first electric motor/generator and the ring gear; and a second gear pass drivingly connected the first electric motor/generator and the sun gear.

In some embodiments, the first gear pass includes a first portion connected to a first rotatable shaft and a second portion drivingly connected to a second rotatable shaft. In some embodiments, the second gear pass includes a first portion connected to a third rotatable shaft and a second portion drivingly connected to a fourth rotatable shaft.

In some embodiments, the electric powertrain includes a first reduction gear set positioned between the first electric motor/generator and the first gear pass.

In some embodiments, the electric powertrain includes a second reduction gear set positioned between the second electric motor/generator and the second gear pass.

In some embodiments, the electric powertrain includes a clutch positioned between the planet carrier and the differential assembly and configured to selectively engage the planet carrier and the differential assembly.

In some embodiments, the electric powertrain includes a third gear pass positioned between the first gear pass and the first electric motor/generator, wherein a first portion of the third gear pass is connected to the second rotatable shaft and a second portion of the third gear pass drivingly connected to an output shaft of the first electric motor/generator.

In some embodiments, the electric powertrain includes a fourth gear pass positioned between the third gear pass and the second electric motor/generator, wherein a first portion of the fourth gear pass is connected to the fourth rotatable shaft and a second portion of the fourth gear pass drivingly connected to an output shaft of the second electric motor/generator.

In some embodiments, at least one of the gear passes is an epicyclic gear set.

In some embodiments, the electric powertrain includes an over run clutch positioned between the ring gear and the first gear pass configured to selectively engage the ring gear and the first gear pass.

In some embodiments, the first and second electric motor/generators are parallel to the drive axle.

In some embodiments, the first and second electric motor/generators are axially adjacent to each other. In some embodiments, the first and second rotatable shafts are coaxial with drive axle.

In some embodiments, the electric axle includes a second clutch connected to a power take off unit and the second electric motor/generator, wherein the second clutch is configured to selectively connect the power take off unit and the electric powertrain.

BRIEF DESCRIPTION OF THE DRAWINGS

Novel features are set forth with particularity in the appended claims. A better understanding of the features and advantages of the embodiments will be obtained by reference to the following detailed description that sets forth illustrative embodiments, in which the principles of the embodiments are utilized, and the accompanying drawings of which:

DETAILED DESCRIPTION OF THE PREFERRED EMBODIMENTS

It is to be understood that the invention may assume various alternative orientations and step sequences, except where expressly specified to the contrary. It is also to be understood that the specific devices and processes illustrated in the attached drawings, and described in the following specification are simply exemplary embodiments. Hence, specific dimensions, directions, orientations or other physical characteristics relating to the embodiments disclosed are not to be considered as limiting, unless expressly stated otherwise.

Provided herein are electric powertrain configurations that may be used in hybrid and/or electric vehicles. The powertrains disclosed herein provide for an electric axle that provides high torque ratios and energy harvesting/energy recuperation abilities.

In some embodiments, the electric powertrains are part of electric axles which are incorporated into vehicles as tag or secondary axles in tandem or multiple axle vehicle systems.

It should be understood that electric or hybrid electric vehicles incorporating embodiments of the powertrains disclosed herein are capable of including a number of other additional powertrain components, such as, but not limited to, high-voltage battery pack with a battery management system or ultracapacitor, on-board charger, DC-DC converters, a variety of sensors, actuators, and controllers, among others.

The preferred embodiments will now be described with reference to the accompanying figures. The terminology used in the descriptions below is not to be interpreted in any limited or restrictive manner simply because it is used in conjunction with detailed descriptions of certain specific embodiments.

Furthermore, the embodiments include several novel features, no single one of which is solely responsible for its desirable attributes or which is essential to practicing the preferred embodiments described.

Figure 1:
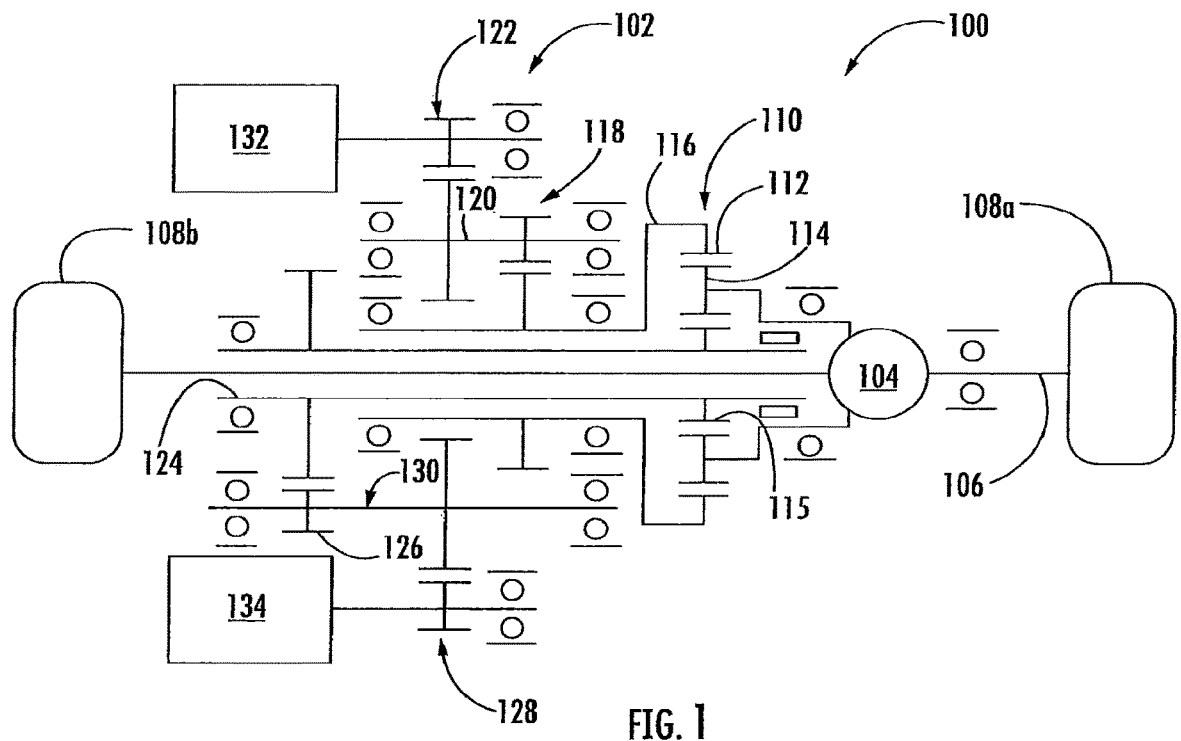
FIG. 1 is a schematic view of one preferred embodiment of an electric axle.

FIG. 1 is a schematic style view of an electric powertrain 100 according to a preferred embodiment. The electric powertrain 100 is a motor/generator driven powertrain, and may be operated in a plurality of operating modes.

Referring to FIG. 1, one preferred embodiment of an electric axle powertrain 100 includes a drivetrain 102 operably coupled to a differential assembly 104.

In some embodiments, the differential assembly 104 assembly includes a common differential gear set implemented to transmit rotational power. The differential assembly 104 is operably coupled to a drive axle 106 configured to drive a set of wheels 108a, 108b on the ends thereof.

The differential assembly 104 is drivingly connected to a first planetary gear set 110. The first planetary gear set 110 is provided with a ring gear 112, a planet carrier 114, and a sun gear 115. The planet carrier 114 rotationally supports a plurality of planet gears that couple the sun gear 115 to the ring gear 112.

In some embodiments, the differential assembly 104 is coupled directly to the planet carrier 114.

The ring gear 112 is drivingly connected to a rotatable shaft 116. Shaft 116 has a portion of a gear pass (or gear set) 118 drivingly connected thereto. Gear pass 118 drivingly connects shaft 116 with a rotatable shaft 120. Shaft 120 has a portion of a gear pass 122 (or gear set) drivingly connected thereto. Gear pass 122 drivingly connects shaft 120 to an output of a first motor/generator 132.

In some embodiments, shaft 120 extends axially, parallel to the drive axle 106.

In some embodiments, shaft 120 is perpendicular to the drive axle 106 and the gear pass 118 is a right angle ring and pinion gear set.

The sun gear 115 is rotatably connected to a rotatable shaft 124. Shaft 124 has a portion of a gear pass 126 (or gear set) drivingly connected thereto. Gear pass 126 drivingly connects shaft 124 to a rotatable shaft 130. Shaft 130 has a portion of a gear pass 128 (or gear set) drivingly connected thereto.

In some embodiments, shaft 130 extends axially, parallel to the drive axle 106. Gear pass 128 drivingly connects shaft 130 to an output of a second motor/generator 134.

In some embodiments, shaft 124 extends axially, parallel to the drive axle 106.

In some embodiments, shaft 124 is perpendicular to the drive axle and gear pass 126 is a right angle ring and pinion gear set.

In some embodiments, the motor/generators 132, 134 are capable of providing kinetic energy and converting a kinetic energy input to an electrical energy output (i.e. operate as a motor and a generator). For example, when the operator of the vehicle depresses the brake pedal the generator can covert the kinetic energy into electrical energy (i.e. regenerative braking).

In some embodiments, the motor/generators 132, 134 are connected to an energy storage device. The energy storage device can be a battery having a battery pack or a capacitor; however, it is understood that other embodiments may include other power sources including electrochemical energy conversion devices or combinations thereof including, but not limited to, an ultracapicitor or a fuel cell particularly in a fuel cell electric vehicle drivetrains (FCEV).

In some embodiments, the powertrain 100 is provided in a tag or secondary axle of a tandem axle or multi-axle system.

In some embodiments, the first and second motor/generators 132, 134 are positioned on radially opposite sides of the drive axle 106.

In some embodiments, at least one of gear passes 118, 122, 126 or 128 are a step gear set or an epicyclic gear set.

In some embodiments, the first motor/generator 132 is perpendicular to the drive axle 106 and one of gear pass 122 or gear pass 118 is a right angle ring and pinion gear set.

In some embodiments, the second motor/generator 134 is perpendicular to the drive axle 106 and one of gear pass 128 or gear pass 126 is a right angle ring and pinion gear set.

In some embodiments, at least one of gear passes 118, 122, 126 or 128 are step gears or epicyclic gears.

The planetary gear set 110 may function as a power summation point or a power split point depending on the mode of operation of the powertrain 100. The planetary gear set 110 functions as a power summation point of power from the motor/generators 132, 134 when power flows to the wheels 108a, 108b and as a power split when the motor/generators 132, 134 function as generators. When the power flow comes from the wheels 108a, 108b, the planetary gear set 110 splits power at the carrier 114 and the kinetic energy 20 provided can be recuperated by the motor/generator(s) 132, 134.

For any given wheel speed the first motor/generator 132 (or alternatively the second motor/generator 134) can operate as a motor providing power to the powertrain 100 and the second motor/generator 134 (or alternatively the second motor/generator 132) can operate as a generator. The generator 134 can maintain the state of charge in the battery pack or level of energy stored in the energy storage device at a sustainable or threshold level. By doing so, the energy storage device is able to provide the powertrain 100 energy for on-demand boosting if desired. If both the first and second motor/generators 132, 134 are operating as generators, the powertrain 100 provides a higher energy recuperation.

The motor 132 and generator 134 can operate at independent speeds due to the presence of the planetary gear set 110 which splits the power from the wheels with the differential assembly 104 connected to the carrier 114. The motor/generator 132, 134 speeds are not limited to the wheel 108a, 108b speeds providing greater efficiency to the powertrain 100.

The electric powertrain 100 can operate in multiple modes of operation providing a change in speed ratio from high to low continuously by controlling the speed of the first motor/generator 132 providing of a continuously variable electric variable axle.

In some embodiments, all components of the powertrain 100 are under the supervisory control of a vehicle system controller (VSC) not shown. Each powertrain component can have a separate controller under the supervisory control of the VSC.

In some embodiments, the powertrain 100 includes a separate battery controller (not shown) as part of a battery management system (not shown).

In some embodiments, the controller and/or VSC is configured to receive a number of electronic signals from sensors provided on the powertrain, vehicle, wheels, etc. The sensors optionally include temperature sensors, speed sensors, position sensors, among others.

In some embodiments, the controller and the VSC are configured to perform routines such as signal acquisition, signal arbitration, or other known methods for signal processing and is configured to electronically communicate to a variety of actuators and sensors.

Figure 2:
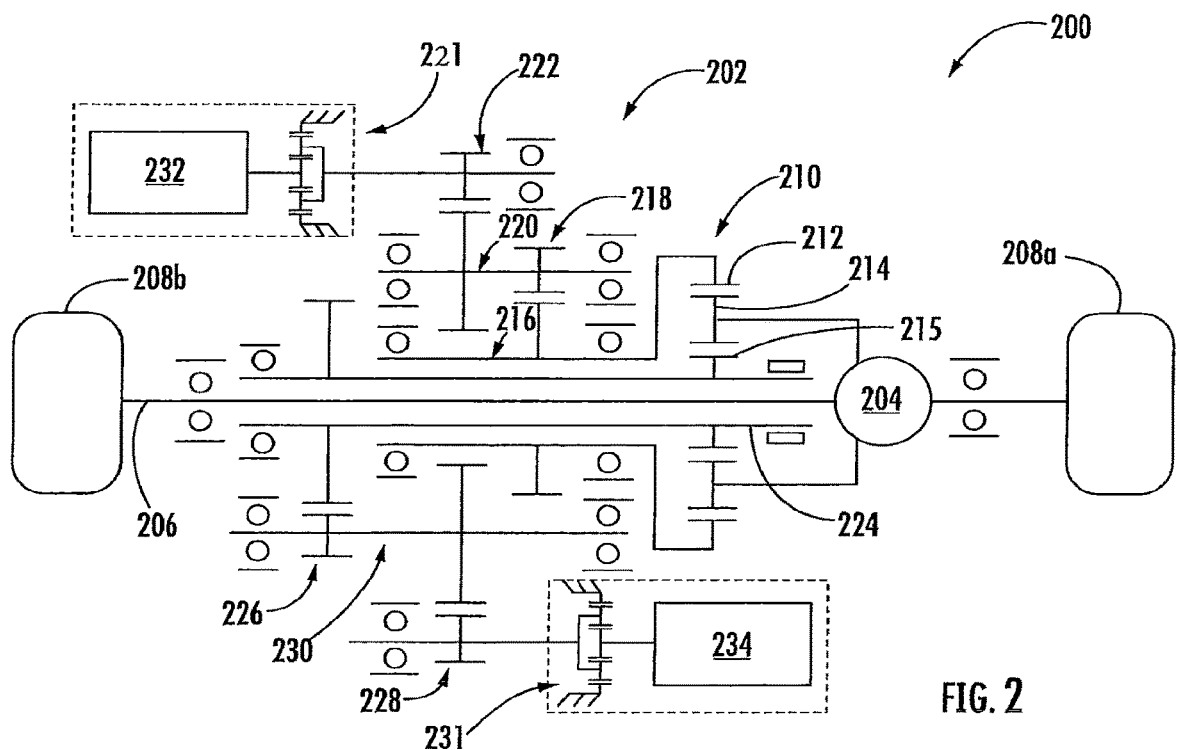
FIG. 2 is a schematic view of another preferred embodiment of an electric axle.

FIG. 2 depicts another preferred embodiment an electric powertrain 200. The embodiment shown in FIG. 2 includes similar components to the powertrain 100. Similar features of the embodiment shown in FIG. 2 are numbered similarly in series. Different and additional features of the variation shown in FIG. 2 are described hereinbelow and can be appreciated by one skilled in the art in view of FIG. 1 and the other embodiments illustrated and described in this disclosure.

The electric axle powertrain 200 includes a drivetrain 202 operably coupled to a differential assembly 204.

In some embodiments, the differential assembly 204 includes a common differential gear set implemented to transmit rotational power.

The differential assembly 204 is operably coupled to a drive axle 206 configured to drive a set of vehicle wheels 208a, 208b on the ends thereof. The differential assembly 204 is drivingly connected to a first planetary gear set 210. The first planetary gear set 210 is provided with a ring gear 212, a planet carrier 214, and a sun gear 215. The planet carrier 214 rotationally supports a plurality of planet gears that couple the sun gear 215 to the ring gear 212. The ring gear 212 is drivingly connected to a rotatable shaft 216. Shaft 216 has a 10 portion of a gear pass 218 drivingly connected thereto. Gear pass 218 drivingly connects shaft 216 with a rotatable shaft 220. Shaft 220 has a portion of a gear pass 222 drivingly connected thereto.

In some embodiments, the differential assembly 204 is coupled to the planet carrier 214.

In some embodiments, shaft 220 extends axially, parallel to the drive axle 206.

In some embodiments, shaft 220 is perpendicular to the drive axle 206 and the gear pass 218 is a right angle ring and pinion gear set.

Gear pass 222 drivingly connects shaft 220 to a reduction unit 221 including a reducing gear set 223 drivingly connected to an output of a first motor/generator 232. The sun gear 215 is rotatably connected to a rotatable shaft 224.

In some embodiments, shaft 224 extends axially, parallel to the drive axle 206.

Shaft 224 has a portion of a gear pass 226 drivingly connected thereto. Gear pass 226 drivingly connects shaft 224 to a rotatable shaft 230. Shaft 230 has a portion of a gear pass 228 drivingly connected thereto. Gear pass 228 drivingly connects shaft 230 to a reduction unit 231 including a reducing gear set 233 drivingly connected to an output of a second motor/generator 234.

In some embodiments, the first and second motor/generators 232, 234 are positioned parallel to the drive axle 206.

In some embodiments, at least one of gear passes 218, 222, 226 or 228 are a step gear set or an epicyclic gear set.

In some embodiments, the first motor/generator 234 is perpendicular to the drive axle 206 and one of gear pass 222 or gear pass 218 is a right angle ring and pinion gear set.

In some embodiments, the second motor/generator 234 is perpendicular to the drive axle 206 and one of gear pass 228 or gear pass 226 is a right angle ring and pinion gear set.

As shown in FIG. 2, in some embodiments, the reducing gear set 223, 233 are planetary gear sets that provide a primary gear reduction.

By providing an initial gear reduction, the planetary gear set 210 can have lower gear ratios and the gear passes 218, 222, 226, 228 include small diameter gears reducing the overall number of gear passes and thereby reducing the drivetrain packaging requirements.

In some embodiments, the reducing planetary gear sets 223, 233 can include a sun gear, a ring gear, and a plurality of compound planet gears rotatably mounted to a planet carrier. The sun gear can be integrally formed at one of the output shaft of the motor/generator 232, 234. The ring gear is fixed to a stationary member or housing assembly. The planet carrier is drivingly connected to gear pass 222.

In some embodiments, the reducing gear sets 223, 233 are coaxial with the outputs of the motor/generators 232, 234.

Figure 3:
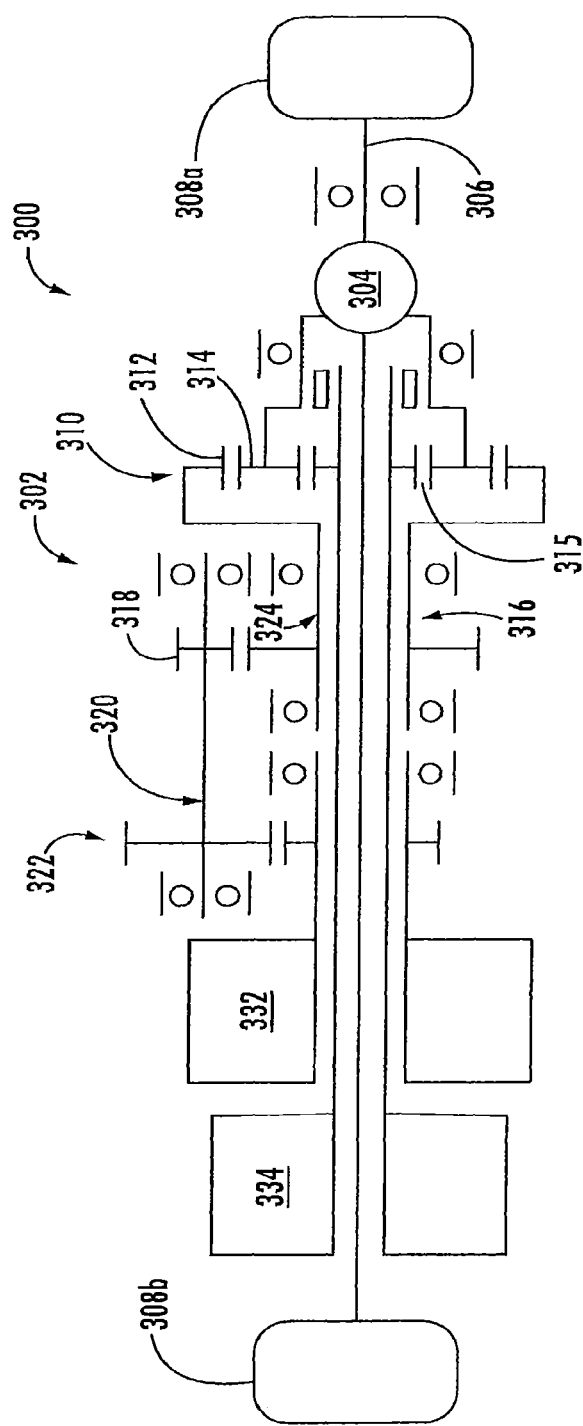
FIG. 3 is a schematic view of another preferred embodiment of an electric axle.

FIG. 3 depicts another preferred embodiment of an electric powertrain 300. The embodiment shown in FIG. 3 includes similar components to the powertrain 100. Similar features of the embodiment shown in FIG. 3 are numbered similarly in series. Different and additional features of the variation shown in FIG. 3 are described hereinbelow and can be appreciated by one skilled in the art in view of FIG. 1 and the other embodiments illustrated and described in this disclosure.

The electric axle powertrain 300 includes a drivetrain 302 operably coupled to a differential assembly 304.

In some embodiments, the differential assembly 304 includes a common differential gear set implemented to transmit rotational power. The differential assembly 304 is operably coupled to a drive axle 306 configured to drive a set of vehicle wheels 308a, 308b on the ends thereof.

The differential assembly 304 is drivingly connected to a first planetary gear set 310. The first planetary gear set 310 is provided with a ring gear 312, a planet carrier 314, and a sun gear 315. The planet carrier 314 rotationally supports a plurality of planet gears that couple the sun gear 315 to the ring gear 312.

In some embodiments, the differential assembly 304 is coupled to the planet carrier 312.

The ring gear 312 is drivingly connected to a rotatable shaft 316. Shaft 316 has a portion of a gear pass 318 drivingly connected thereto. Gear pass 318 drivingly connects shaft 316 with a rotatable shaft 320. Shaft 320 has a portion of a gear pass 322 drivingly connected thereto.

In some embodiments, shaft 320 extends axially, parallel to the drive axle 306. Gear pass 322 drivingly connects shaft 320 to an output of a first motor/generator 332.

The sun gear 315 is rotatably connected to a rotatable shaft 324. Shaft 324 is drivingly connected to an output of a second motor/generator 334.

In some embodiments, shaft 324 extends axially, parallel to the drive axle 306.

In some embodiments, the first and second motor/generators 332, 334 are axially adjacent to each other and the rotatable shafts 316 and 320 are coaxial with the drive axle 306.

In some embodiments, the output shafts of the first motor/generator and the second motor/generator are concentric.

In some embodiments, shaft 320 is transfer to the output shafts of the first and second motor/generators.

In some embodiments, at least one of gear passes 318, 322, 326 or 328 is a step gear set or an epicyclic gear set.

Figure 4:
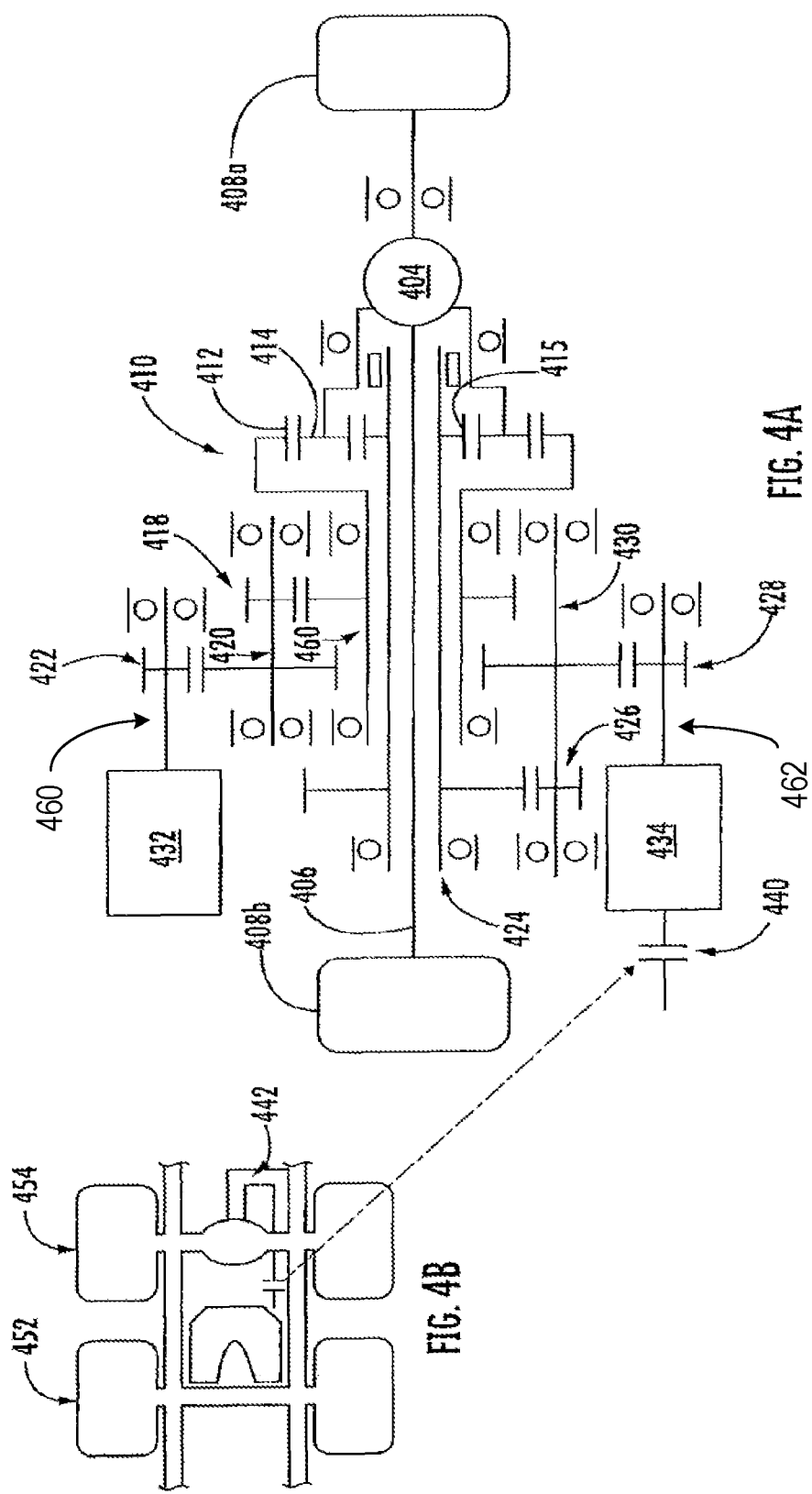
FIG. 4A is a schematic view of another preferred embodiment of an electric axle.
FIG. 4B is a schematic view of a tandem axle system including the electric axle depicted in FIG. 4A.

FIG. 4A depicts another preferred embodiment an electric powertrain 400. The embodiment shown in FIG. 4A includes similar components to the powertrain 100. Similar features of the embodiment shown in FIG. 4A are numbered similarly in series. Different and additional features of the variation shown in FIG. 4A are described hereinbelow and can be appreciated by one skilled in the art in view of FIG. 1 and the other embodiments illustrated and described in this disclosure.

The electric axle powertrain 400 includes a drivetrain 402 operably coupled to a differential assembly 404. The differential assembly 404 is operably coupled to a drive axle 406 configured to drive a set of vehicle wheels 408a, 408b on the ends thereof.

In some embodiments, the differential assembly 404 includes a common differential gear set implemented to transmit rotational power.

The differential assembly 404 is drivingly connected to a first planetary gear set 410. The first planetary gear set 410 is provided with a ring gear 412, a planet carrier 414, and a sun gear 415. The ring gear 412 is drivingly connected to a rotatable shaft 416. Shaft 416 has a portion of a gear pass 418 drivingly connected thereto. Gear pass 418 drivingly connects shaft 416 with a rotatable shaft 420. Shaft 420 has a portion of a gear pass 422 drivingly connected thereto. Gear pass 422 drivingly connects shaft 420 to an output shaft 460 of a first motor/generator 432.

In some embodiments, the differential assembly 404 is coupled to the planet carrier 414.

The sun gear 415 is rotatably connected to a rotatable shaft 424. Shaft 424 has a portion of a gear pass 426 drivingly connected thereto. Gear pass 426 drivingly connects shaft 424 to a rotatable shaft 430. Shaft 430 has a portion of a gear pass 428 drivingly connected thereto. Gear pass 428 drivingly connects shaft 430 to an output shaft 462 of a second motor/generator 434.

In some embodiments, shaft 424 extends axially, parallel to the drive axle 406.

In some embodiments, the first and second motor/generators 432, 434 are positioned parallel to the drive axle 406.

In some embodiments, at least one of gear passes 418, 422, 426 or 428 is a step gear set or an epicyclic gear set.

In some embodiments, the first motor/generator 432 is perpendicular to the drive axle 406 and one of gear pass 422 or gear pass 418 is a right angle ring and pinion gear set.

In some embodiments, the second motor/generator 434 is perpendicular to the drive axle 406 and one of gear pass 428 or gear pass 426 is a right angle ring and pinion gear set.

In some embodiments, the drivetrain 410 includes a clutch 440 that selectively connects the second motor/generator 434 to a drive shaft. The clutch 440 is in communication with the controller.

In some embodiments, the clutch 440 is connected to a power take off 15 unit 442.

FIG. 4B depicts the location of the clutch 440 in a tandem axle system 450 having an electric tag axle 452, a driven axle 454 and a PTO device 442. By connecting the drive axle 454 to a drive shaft, the drive axle 454 has electrically continuously variable functionality. If the clutch 440 is engaged, then the axle 454 becomes a dedicated hybrid transaxle.

When the system 450 is connected to an internal combustion engine or other power source, when clutch 440 is engaged power from the internal combustion engine us added to the power supplied by the motor/generator 434 and motor/generator 432 functions as a generator.

In some embodiments, clutch 440 is a dog clutch, clone clutch, wet clutch or dry clutch.

In some embodiments, clutch 440 is a hydraulically actuated wet clutch pack.

In some embodiments, a second disconnect clutch 444 is added to one of the wheels of the tag axle 452. The electric tag axle 452 can be used to export power to a grid for a plug-in hybrid vehicle embodiment which has an onboard charger. In some embodiments, the vehicle includes an auxiliary power unit powered by the electric tag axle 452 when the vehicle is stationary and can include exportable power to grid configurations.

Figure 5:
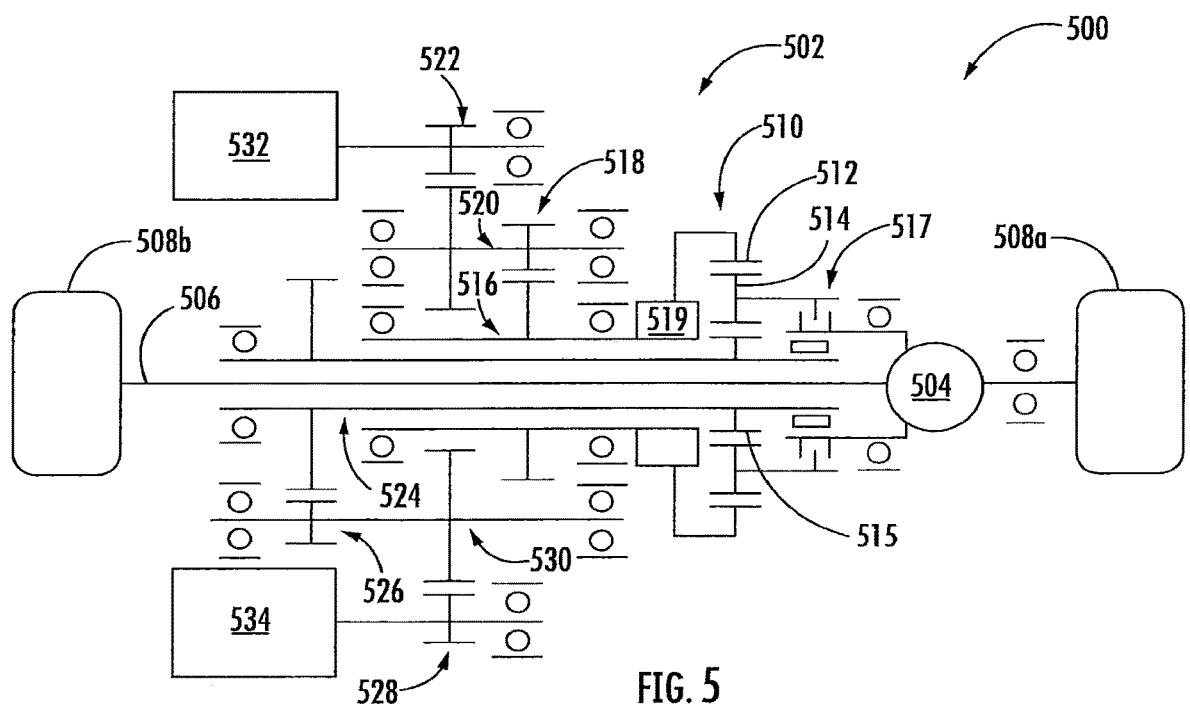
FIG. 5 is a schematic view of another preferred embodiment of an electric axle.

FIG. 5 depicts another preferred embodiment an electric powertrain 500. The embodiment shown in FIG. 5 includes similar 5 components to the powertrain 100. Similar features of the embodiment shown in FIG. 5 are numbered similarly in series. Different and additional features of the variation shown in FIG. 5 are described hereinbelow and can be appreciated by one skilled in the art in view of FIG. 1 and the other embodiments illustrated and described in this disclosure.

The electric powertrain 500 includes a drivetrain 502 operably coupled to a differential assembly 504.

In some embodiments, the differential assembly 504 includes a common differential gear set implemented to transmit rotational power.

The differential assembly 504 is operably coupled to a drive axle 506 configured to drive a set of vehicle wheels 508a, 508b on the ends thereof. The differential assembly 504 is drivingly connected to a first planetary gear set 510. The first planetary gear set 510 is provided with a ring gear 512, a planet carrier 514, and a sun gear 515.

In some embodiments, the differential assembly 504 is selectively drivingly coupled to the planet carrier 514.

A clutch 517 is positioned between the planet carrier 514 and the differential assembly 504 to selectively couple the differential assembly 504 to the carrier 514. When the clutch 517 is disengaged, the differential assembly 504 runs in a neutral mode minimizing drag losses by disengaging the powertrain from the differential assembly 504.

In some embodiments, the ring gear 512 is drivingly connected to an over run clutch 519. The over-run clutch 519 is drivingly connected to the ring gear 512 and a shaft 516.

Shaft 516 has a portion of a gear pass 518 drivingly connected thereto. Gear pass 518 drivingly connects shaft 516 with a rotatable shaft 520. Shaft 520 has a portion of a gear pass 522 drivingly connected thereto. Gear pass 522 drivingly connects shaft 520 to an output of a first motor/generator 532.

The sun gear 515 is rotatable connected to a rotatable shaft 524. Shaft 524 has a portion of a gear pass 526 drivingly connected thereto. Gear pass 5 526 drivingly connects shaft 524 to a rotabable shaft 530. Shaft 530 has a portion of a gear pass 528 drivingly connected thereto. Gear pass 528 drivingly connects shaft 530 to an output of a second motor/generator 534. In some embodiments, shaft 524 extends axially, parallel to the drive axle 506.

In some embodiments, the first and second motor/generators 532, 534 are positioned on parallel to the drive axle 506.

In some embodiments, the first motor/generator 532 is perpendicular to the drive axle 506 and one of gear pass 522 or gear pass 518 is a right angle ring and pinion gear set.

In some embodiments, at least one of gear passes 518, 522, 526 or 528 15 is a step gear set or an epicyclic gear set.

In some embodiments, the second motor/generator 534 is perpendicular to the drive axle 506 and one of gear pass 528 or gear pass 526 is a right angle ring and pinion gear set.

The over-run clutch 519 prevents the motor/generator 532 from being back driven by the powertrain 500. The ring gear 512 of the planetary gear set 510 can experience higher torque than the sun gear 515 because of the ring-to-sun (RTS) ratio. If the motor/generator 532 cannot produce enough torque such that torque on the ring gear 512 is not equal to the torque on the sun gear 515 multiplied by the RTS ratio, the ring gear 512 is back driven. The over-run clutch 519 is placed along the motor/generator 532 to ring gear 512 power path to prevent the ring gear 512 from back rotating.

In some embodiments, the over-run clutch 519 is a directional over run clutch. The directional over run clutch 519, when energized, allows the motor/generator 532 to reverse the rotation of the output of the motor/generator 532 rotate as needed such as when the motor/generator 532 is operating in a regeneration mode.

A controller can control the operating mode of the powertrain 500 by at least by controlling the engagement of the over-run clutch 519 and clutch 517. In response to a signal sent by the controller, an actuator can engage the over-run clutch 519 and/or the clutch 517.

Figure 6:
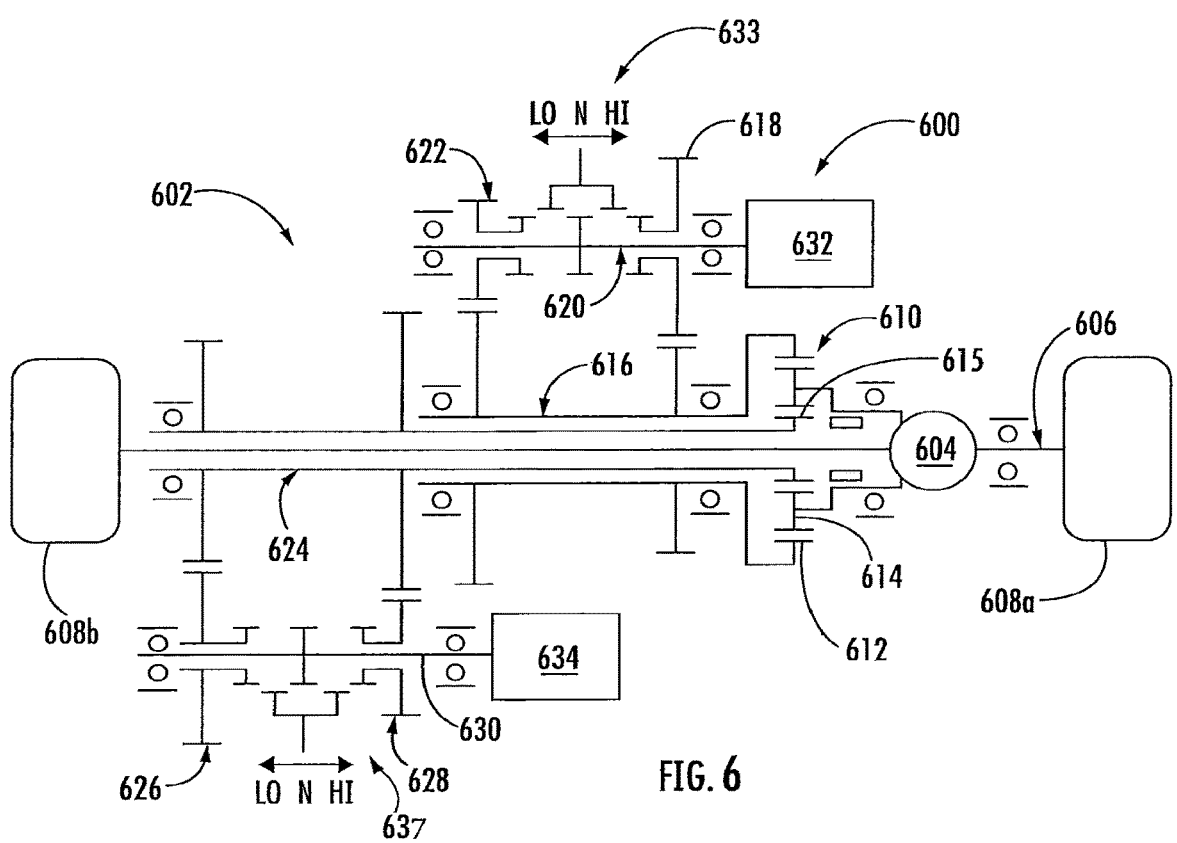
FIG. 6 is a schematic view of another preferred embodiment of an electric axle.

FIG. 6 depicts another preferred embodiment of an electric powertrain 600. The embodiment shown in FIG. 6 includes similar components to the powertrain 100. Similar features of the embodiment shown in FIG. 6 are numbered similarly in series. Different and additional features of the variation shown in FIG. 6 are described hereinbelow and can be appreciated by one skilled in the art in view of FIG. 1 and the other embodiments illustrated and described in this disclosure.

The electric powertrain 600 includes a drivetrain 602 operably coupled to a differential assembly 604. The differential assembly 604 is operably coupled to a drive axle 606 configured to drive a set of vehicle wheels 608a, 608b on the ends thereof. The differential assembly 604 is drivingly connected to a first planetary gear set 610. The first planetary gear set 610 is provided with a ring gear 612, a planet carrier 614, and a sun gear 614.

In some embodiments, the differential assembly 604 includes a common differential gear set implemented to transmit rotational power.

In some embodiments, the differential assembly 604 is drivingly coupled to the planet carrier 614.

The ring gear 612 is drivingly connected to a rotating shaft 616. Shaft 616 has a portion of a gear pass 618 drivingly connected thereto. Gear pass 618 selectively drivingly connects shaft 616 with a rotatable shaft 620. Shaft 616 has a portion of a gear pass 622 drivingly connected thereto. Gear pass 622 selectively drivingly connects shaft 616 with shaft 620. Shaft 620 is drivingly attached to an output of a first motor/generator 632. The sun gear 615 is rotatably connected to a rotatable shaft 624.

Shaft 624 has a portion of a gear pass 626 drivingly connected thereto. Gear pass 626 selectively drivingly connects shaft 624 to a rotatable shaft 630. Shaft 630 has a portion of a gear pass 628 drivingly connected thereto. Gear pass 628 selectively drivingly connects shaft 630 to shaft 624. Shaft 630 is drivingly attached to an output of a second motor/generator 634.

In some embodiments, shaft 624 extends axially, parallel to the drive axle 606.

In some embodiments, the first and second motor/generators 632, 634 are positioned parallel to the drive axle 606.

In some embodiments, the first motor/generator 632 is perpendicular to the drive axle and one of gear pass 622 or gear pass 618 is a right angle ring and pinion gear set.

In some embodiments, at least one of gear passes 618, 622, 626 or 628 is a step gear set or an epicyclic gear set.

In some embodiments, the second motor/generator 634 is perpendicular to the drive axle 606 and one of gear pass 628 or gear pass 626 is a right angle ring and pinion gear set.

The powertrain 600 is configured to be placed in at least two modes of operation, depending on a position of a selector sleeve 633. In a first mode of operation, the powertrain 600 operates in a low speed mode operation. In a second mode of operation, the powertrain 600 operates in a high speed mode operation.

A controller can control the operating mode of the powertrain 600 by at least by adjusting a position of the selector sleeve 633. To switch between the modes of operation, a selector sleeve 633 engage shafts 620 with either gear pass 622 and 618 by means of a clutching action. A shift fork 635 disposed in an annular recess formed in the selector sleeve 633 moves the selector sleeve 633 along the axis of shaft 620 into a first position, a second position, or a neutral position. In response to a signal sent by the controller, an actuator adjusts a position of the selector sleeve 633.

In the first position or low mode of operation, the selector sleeve 633 is drivingly engaged with the gear pass 622 and shaft 620. The power is transferred from the motor/generator 632 through the selector spline to gear pass 622 to shaft 616 through the planetary gear set 610 to the differential assembly 604 and, thus, to the wheels 608a, 608b through the drive axle 606.

In the second position or high speed mode of operation, the selector sleeve 633 is drivingly engaged with gear pass 618 and shaft 620. The power is transferred from the motor/generator 632 through the selector spline to gear pass 618, to shaft 616 through the planetary gear set 610 to the differential assembly 604 and, thus, to the wheels 608a, 608b through the drive axle 606.

In the neutral position, the selector sleeve 633 engages neither gear pass 622 or gear pass 618, the selector sleeve 633 is in a neutral position.

The powertrain 600 is configured to be placed in multiple modes of operation, depending on a position of a selector sleeve 637. In a first mode of operation, the powertrain 600 operates in a high speed mode operation. In a second mode of operation, the powertrain 600 operates in a low speed mode operation. In the high and low modes of operation the ratios are continuously variable within a range determined by the ratios of the gear passes and planetary gear set.

Similarly, the controller can control the operating mode of the powertrain 600 by at least by adjusting a position of the selector sleeve 637. To switch between the modes of operation, a selector sleeve 637 engage shaft 630 with either gear pass 626 and 628 by means of a clutching action. A shift fork 639 disposed in an annular recess formed in the selector sleeve 637 moves the selector sleeve 637 along the axis of shaft 630 into a first position, a second position, or a neutral position. In response to a signal sent by the controller, an actuator adjusts a position of the selector sleeve 637.

In the first position or low mode of operation, the selector sleeve 637 is drivingly engaged with the gear pass 626 and shaft 630. The power is transferred from the motor/generator 634 through the selector spline to gear pass 626 to shaft 624 through the planetary gear set 610 to the differential assembly 604 and, thus, to the wheels 608a, 608b through the drive axle 606.

In the second position or high speed mode of operation, the selector sleeve 637 is drivingly engaged with gear pass 628 and shaft 630. The power is transferred from the motor/generator 634 through the selector spline to gear pass 628, to shaft 624 through the planetary gear set 610 to the differential assembly 604 and, thus, to the wheels 608a, 608b through the drive axle 606.

In the neutral position, the selector sleeve 637 engages neither gear pass 626 or gear pass 628, the selector sleeve 637 is in a neutral position.

It is understood the selector sleeves 633,637 and shift forks 635, 639 may be substituted with any clutching device that permits selective engagement of a driving and a driven part. In some embodiments, a clutch can be used instead of the shift fork. The clutch can be, but is not limited to, a dog clutch, a clone clutch, a wet or dry clutch including a hydraulically actuated wet clutch pack. If a low speed range is desired the selector spline is engaged with gear pass 622. The power is transferred from the motor/generator 632 through the selector spline to gear pass 622, to shaft 616 through the planetary gear set 610 to the differential assembly 604 and, thus, to the wheels 608a, 608b through the drive axle 606.

If a high speed range is desired the selector spline is engaged with gear pass 618. The power is transferred from the motor/generator 632 through the selector spline to gear pass 618, to shaft 616 through the planetary gear set 610 to the differential assembly 604 and, thus, to the wheels 608a, 608b through the drive axle 606. When neither gear pass 622 nor gear pass 618 is engaged, the selector sleeve 637 is in a neutral position.

In some embodiments, an over run clutch (not shown) prevents the motor/generator 632 from being back driven by the powertrain 600. The ring gear 612 of the planetary gear set 610 can experience higher torque than the sun gear 615 because of the ring-to-sun (RTS) ratio. If the motor/generator 632 cannot produce enough torque such that torque on the ring gear 612 is not equal to the torque on the sun gear 615 multiplied by the RTS ratio, the ring gear 612 is back driven. The over-run clutch 619 is placed along the motor/generator 632 to ring gear 612 power path to prevent the ring gear 614 from back rotating.

It should further be noted that the electric powertrains disclosed herein are optionally used as primary drive axles, second drive axles, or both.

It should be understood that each gear pass can include multiple gears including planetary gears. In some embodiments, at least one of the gear passes is a planetary gear set having a sun gear, ring gear and a plurality of planet gears supported by a planet carrier wherein one of the sun gear, ring rear or planet carrier can be grounded to a stationary member or housing.

It should be understood that additional clutches/brakes, step ratios are optionally provided to the hybrid powertrains disclosed herein to obtain varying power path characteristics. It should be noted that the connections of the electric machines to the power paths disclosed herein are provided for illustrative example and it is within a designer's means to couple the electric machines to other components of the powertrains disclosed herein.

It should be noted that the battery is capable of being not just a high voltage pack such as lithium ion or lead-acid batteries, but also ultracapacitors or other pneumatic/hydraulic systems such as accumulators, or other forms of energy storage systems.

The motor/generators described herein are capable of representing hydromotors actuated by variable displacement pumps, electric machines, pneumatic motors driven by pneumatic pumps, etc.

While the preferred embodiments have been shown and described herein, it will be obvious to those skilled in the art that such embodiments are provided by way of example only. Numerous variations, changes, and substitutions will now occur to those skilled in the art without departing from the embodiments. It should be understood that various alternatives to the embodiments described herein are capable of being employed in practicing the embodiments.

Various embodiments as described herein are provided in the Aspects below:

Aspect 1. An electric powertrain comprising: a differential assembly operably coupled to a drive axle having a set of wheels coupled to the ends thereof; a planetary gear set connected to the differential assembly, the planetary gear set having a sun gear, a planet carrier supporting a plurality of planet gears, and a ring gear, wherein the planet carrier is drivingly engaged with the differential assembly; a first electric motor/generator; a second electric motor/generator; a first gear pass drivingly connected to the first electric motor/generator and the ring gear; and a second gear pass drivingly connected to the first electric motor/generator and the sun gear.

Aspect 2. The electric powertrain of Aspect 1, wherein a first portion of the first gear pass is connected to a first rotatable shaft and a second portion of the first gear pass is drivingly connected to a second rotatable shaft.

Aspect 3. The electric powertrain of one of Aspects 1-2, wherein a first portion of the second gear pass is connected to a third rotatable shaft and a second portion of the second gear pass drivingly connected to a fourth rotatable shaft.

Aspect 4. The electric powertrain of one of Aspects 1-3 further comprising a first reduction gear set positioned between the first electric motor/generator and the first gear pass.

Aspect 5. The electric powertrain of one of Aspects 1-4 further comprising a second reduction gear set positioned between the second electric motor/generator and the second gear pass.

Aspect 6. The electric powertrain of one of Aspects 1-5 further comprising a clutch positioned between the planet carrier and the differential assembly, wherein the clutch is configured to selectively engage the planet carrier and the differential assembly.

Aspect 7. The electric powertrain of one of Aspects 1-6 further comprising a third gear pass positioned between the first gear pass and the first electric motor/generator, wherein a first portion of the third gear pass is connected to the second rotatable shaft and a second portion of the third gear pass drivingly connected to an output shaft of the first electric motor/generator.

Aspect 8. The electric powertrain of one of Aspects 1-7 further comprising a fourth gear pass positioned between the third gear pass and the second electric motor/generator, wherein a first portion of the fourth gear pass is connected to the fourth rotatable shaft and a second portion of the fourth gear pass drivingly connected to an output shaft of the second electric motor/generator.

Aspect 9. The electric powertrain of one of Aspects 1-8, wherein at least one of the gear passes is an epicyclic gear set.

Aspect 10. The electric powertrain of one of Aspects 1-9 further comprising an over run clutch positioned between the ring gear and the first gear pass, wherein the over-run clutch is configured to selectively engage the ring gear and the first gear pass.

Aspect 11. The electric powertrain of one of Aspects 1-10, wherein the first and second electric motor/generators are parallel to the drive axle.

Aspect 12. The electric powertrain of one of Aspects 1-11, wherein the first and second electric motor/generators are axially adjacent to each other.

Aspect 13. The electric power train of one of Aspects 1-12, wherein the first and second rotatable shafts are coaxial with drive axle.

Aspect 14. An electric axle comprising the electric powertrain of one of Aspects 1-13.

Aspect 15. The electric axle of Aspect 14 further comprising a second clutch connected to a power take off unit and the second electric motor/generator, wherein the second clutch is configured to selectively connect the power take off unit and the electric powertrain.

What is claimed:

1. An axle assembly, comprising:
a first motor/generator connected to a first output shaft;
a second motor/generator connected a second output shaft;
a differential assembly coupled to a drive axle
a first gear set having a first gear and a second gear, the first gear of the first gear set connected to the first output shaft;
a first rotatable shaft, the second gear of the first gear set connected to the first rotatable shaft;
a second gear set having a first gear and a second gear, the second gear connected to the first rotatable shaft;
a second rotatable shaft, the second gear set connected to the second rotatable shaft; and
a first planetary gear set having a first ring gear, a first planet carrier, and a first sun gear; the first ring gear of the first planetary gear set connected to the second rotatable shaft, the first planetary gear set connected to the differential assembly.

2. The axle assembly of claim 1, further comprising a third gear set having a first gear and a second gear, the first gear of the third gear set connected to the second output shaft; and
a third rotatable shaft, the second gear of the third gear set connected to the third rotatable shaft.

3. The axle assembly of claim 2, further comprising:
a fourth gear set having a first gear and a second gear, the first gear of the fourth gear connected to the third rotatable shaft;
a fourth rotatable shaft extending co-axially the second rotatable shaft and the drive axle, the second gear of the fourth gear set connected to the fourth rotatable shaft; and
wherein the first sun gear of the first planetary gear set is connected to the fourth rotatable shaft.

4. The axle assembly of claim 3, wherein the second rotatable shaft is connected to the fourth rotatable shaft and the drive axle.

5. The axle assembly of claim 3, wherein the fourth rotatable shaft is connected to the drive axle.

6. The axle assembly of claim 1, further comprising a first reduction gear set connecting the first motor/generator to the first gear set.

7. The axle assembly of claim 2, further comprising a second reduction gear set connecting the second motor/generator to the third gear set.

8. The axle assembly of claim 1, further comprising a clutch connecting the second motor/generator to a drive shaft connected to the drive axle.

9. The axle assembly of claim 1, further comprising an over-run clutch connecting the second rotatable shaft to the first ring gear of the first planetary gear set, and the over-run clutch preventing the first motor/generator from being back driven.

10. The axle assembly of claim 1, further comprising a clutch connecting the first planetary gear set to the differential assembly.

11. An axle assembly, comprising:
a first motor/generator connected to a first output shaft;
a second motor/generator connected a second output shaft;
a differential assembly coupled to a drive axle
a first gear set having a first gear and a second gear, the first gear of the first gear set connected to the first output shaft;
a first rotatable shaft, the second gear of the first gear set connected to the first rotatable shaft;
a second gear set having a first gear and a second gear, the second gear connected to the first rotatable shaft;
a second rotatable shaft, the second gear set connected to the second rotatable shaft, and the second rotatable shaft extending co-axially with the drive axle;
a first planetary gear set having a first ring gear, a first planet carrier, and a first sun gear; the first ring gear of the first planetary gear set connected to the second rotatable shaft, the first planetary gear set connected to the differential assembly; and
the second output shaft extending co-axially with the drive axle, the first output shaft, and the second rotatable shaft, and the second output shaft connected to the first sun gear of the first planetary gear set.

12. The axle assembly of claim 11, wherein the first motor/generator and the second motor/generator are directly axially adjacent to each other.

13. The axle assembly of claim 11, wherein the first output shaft is connected to the drive axle and the second output shaft.

14. The axle assembly of claim 11, wherein the second rotatable shaft is connected to the drive axle and the second output shaft.

15. An axle assembly, comprising:
a first motor/generator connected to a first output shaft;
a differential assembly coupled to a drive axle
a first gear set having a first gear and a second gear, the first gear of the first gear set connected to the first output shaft;
a first rotatable shaft, the second gear of the first gear set connected to the first rotatable shaft;
a second gear set having a first gear and a second gear, the second gear connected to the first rotatable shaft;
a second rotatable shaft, the second gear set connected to the second rotatable shaft; and
a first planetary gear set having a first ring gear, a first planet carrier, and a first sun gear; the first ring gear of the first planetary gear set connected to the second rotatable shaft, the first planetary gear set connected to the differential assembly
a second motor/generator drivingly connected to a third rotatable shaft;
a third gear set having a first gear and a second gear;
a fourth gear set having a first gear and a second gear; and
the first gear of the third gear pass and the first gear of the fourth gear pass extend co-axially with the third rotatable shaft.

16. The axle assembly of claim 15, wherein the first gear of the first gear set and the first gear of the second gear set extend co-axially with the first rotatable shaft; and
the second rotatable shaft extends co-axially with the drive axle.

17. The axle assembly of claim 15, further comprising a fourth rotatable shaft;
wherein the second gear of the third gear set and the second gear of the fourth gear set are connected to the fourth rotatable shaft;
wherein the second gear of the third gear set, the second gear of the fourth gear set, and the first sun gear of the first planetary gear set are connected the fourth rotatable shaft;
wherein the fourth rotatable shaft extends co-axially with the drive axle and the second rotatable shaft.

18. The axle assembly of claim 15, further comprising:
a first selector sleeve with a first position and a second position;
wherein in the first position the first selector sleeve connects a plurality of splines on the first rotatable shaft with a plurality of splines on the first gear of the first gear set,
wherein in the second position the first selector sleeve connects the plurality of splines on the first rotatable shaft with a plurality of splines on the first gear of the second gear set.

19. The axle assembly of claim 15, further comprising:
a second selector sleeve with a first position and a second position;
wherein in the first position, the second selector sleeve connects a plurality of splines on the third rotatable shaft with a plurality of splines on the first gear of the third gear set, and
wherein in the second position, the second selector sleeve connects the plurality of splines on the third rotatable shaft with a plurality of splines on the first gear of the fourth gear set.

20. The axle assembly of claim 17, wherein the fourth rotatable shaft has a hollow portion which receives the drive axle.

* * * * *